United States Patent [19]

Rösel

[11] 4,392,147

[45] Jul. 5, 1983

[54] APPARATUS FOR SUPPLYING AND REGULATING A WRITING MEDIUM TO THE WRITING UNIT OF A WRITING OR DRAWING MACHINE

[75] Inventor: Hans-Dieter Rösel, Altdorf, Fed. Rep. of Germany

[73] Assignee: J. S. Staedtler KG, Nuremberg, Fed. Rep. of Germany

[21] Appl. No.: 279,160

[22] Filed: Jun. 30, 1981

[30] Foreign Application Priority Data

Jun. 30, 1980 [DE] Fed. Rep. of Germany ....... 3024678

[51] Int. Cl.³ ............................................ G01D 15/18
[52] U.S. Cl. ................................................ 346/140 R
[58] Field of Search ........................... 346/75, 140, 141

[56] References Cited

U.S. PATENT DOCUMENTS

| 2,606,093 | 8/1952 | Reason | 346/140 X |
| 3,543,279 | 11/1970 | Rempel et al. | 346/141 |
| 3,719,952 | 3/1973 | Elbaum | 346/75 |
| 3,835,881 | 9/1974 | Dal et al. | 346/140 IJ X |
| 3,906,513 | 9/1975 | Siegelman et al. | 346/140 R |
| 3,943,527 | 3/1976 | Hartmann | 346/140 R X |

*Primary Examiner*—Donald A. Griffin
*Attorney, Agent, or Firm*—Edmund M. Jaskiewicz

[57] ABSTRACT

An apparatus for supplying a liquid writing medium to the writing unit of a writing or drawing device has a writing unit connected by a flow line to a dip tube in a container for a liquid writing medium. The bottom of the container is located in substantially the same horizontal plane as the writing tip of the writing unit. From a suitable source, air is supplied under pressure to the surface of the writing medium within the container. The surface area of the writing medium within the container is greater than the surface area of the writing medium within the writing unit. A regulating valve connected between the container and source of air under pressure regulates the flow of liquid writing medium by supplying writing medium when the writing unit is operative and interrupting the writing medium when the writing unit is nonoperative.

14 Claims, 3 Drawing Figures

APPARATUS FOR SUPPLYING AND REGULATING A WRITING MEDIUM TO THE WRITING UNIT OF A WRITING OR DRAWING MACHINE

The present invention relates to automatic writing or drawing machines, more particularly, to an apparatus for supplying and regulating the writing medium to the writing unit of the writing or drawing machine.

Automatic writing or drawing machines are known in which a liquid writing medium is supplied to the writing unit by air under pressure acting on the surface of the writing medium within the writing medium container. The container is usually connected by at least one duct and at least one control valve to the writing unit. Such an apparatus for the supplying and regulating of writing medium to the writing unit of an ink pen recording apparatus is shown in GB No. PS 738,745. This known apparatus includes a writing medium container and a very complicated changeover valve having a magnetic switch and at least five connections. There is also an extensive network of connecting ducts, a source of compressed air and a separate reduced pressure system consisting of a pump and container similarly controlled by the changeover valve. Because of this rather complicated structure utilizing a large number of components and structure elements, this apparatus is expensive, not particularly reliable in operation and relatively sluggish in operation. Thus, this particular apparatus is not feasible for use in writing and drawing machines which must be capable of operating very rapidly.

In comparison to this rather complicated apparatus described above, there has also been proposed a more simplified apparatus for controlling the supply of writing medium to a recording instrument as shown in GB No. PS 707,894. This apparatus consists only of a source of compressed air, a changeover valve, a writing medium container and a few connecting flow lines. However, this simplified apparatus has the disadvantage that the changeover valve does not permit a rapid changeover as may be required since the valve is only hand operated. Even if there should be a sudden changeover, there is no abrupt venting of the pressure system since the air pump will continue to operate and will build up pressure so that the writing medium will be gradually sucked completely from the writing unit. Since all inlet and outlet paths of the changeover valve are completely closed during short operating pauses or interruptions, the writing medium remains constantly standing in the writing unit which in turn invariably leads to the irregular delivery of writing medium when a new writing operation is initiated. Usually, at the beginning of the writing operation the lines are too heavy. As a result, this particular known apparatus is not particularly suitable for use in antomatic writing or drawing machines.

It is therefore the principal object of the present invention to provide a novel and improved apparatus for supplying a writing medium to the writing unit of a writing or drawing machine or the like.

It is another object of the present invention to provide such an apparatus which is simple in construction, inexpensive to build and operate, and reliable in operation a very high operating or drawing speeds.

It is a further object of the present invention to provide such an apparatus wherein the writing tip of the writing unit will always produce clean, uniform and regular lines.

According to one aspect of the present invention such an apparatus for supplying a writing medium to the writing unit of a writing or drawing machine or the like may comprise a writing unit connected by a flow line to a dip tube which dips below the surface of liquid writing medium in a container. The bottom of the container is disposed in substantially the same horizontal plane as the writing tip of the writing unit. Air is supplied under pressure to the surface of the writing medium within the container. The surface area of the writing medium within the container is greater than the surface area of the writing medium within the writing unit. A regulating valve is interconnected between the container and a source of air under pressure for regulating the flow of liquid writing medium to the writing unit by supplying writing medium when the writing unit is operative and interrupting the writing medium when the writing unit is nonoperative.

The present apparatus provides a particularly rapid venting of the apparatus and provides for increased reliability during operation because of the greater surface area of the liquid writing medium in the container as compared to the surface area of the writing medium in the ink chamber of the writing unit and also by the vertical relationship of the container and writing unit with respect to each other wherein the lower surfaces of both components are located substantially on the same horizontal plane. The different cross-sectional areas of the supplies of liquid in the container and the writing unit thus result in a very rapid pressure build up of the writing medium in the writing unit and only for a very slight draining of the writing medium from the writing unit, while providing for practically immediate writing simultaneously with the operating of the writing unit.

When it is necessary that the writing head be relatively small or must be capable of ready and easy movement independently of other machine components, the writing head can be constructed separately from the writing medium container and connected to the container by flexible flow lines. The container can then be mounted so as to be completely immovable or may be mounted on the guide slide so as to be moveable only in a horizontal plane with respect to the machine while the writing unit itself may be displaceable both horizontally and vertically independently of the position of the container.

Other objects and advantages of the present invention will be apparent upon reference to the accompanying description when taken in conjunction with the following drawings, which are exemplary, wherein.

Proceeding next to the drawings wherein like reference symbols indicated the same parts throughout the various views a specific embodiment and modifications of the present invention will be described in detail.

Figure 1:
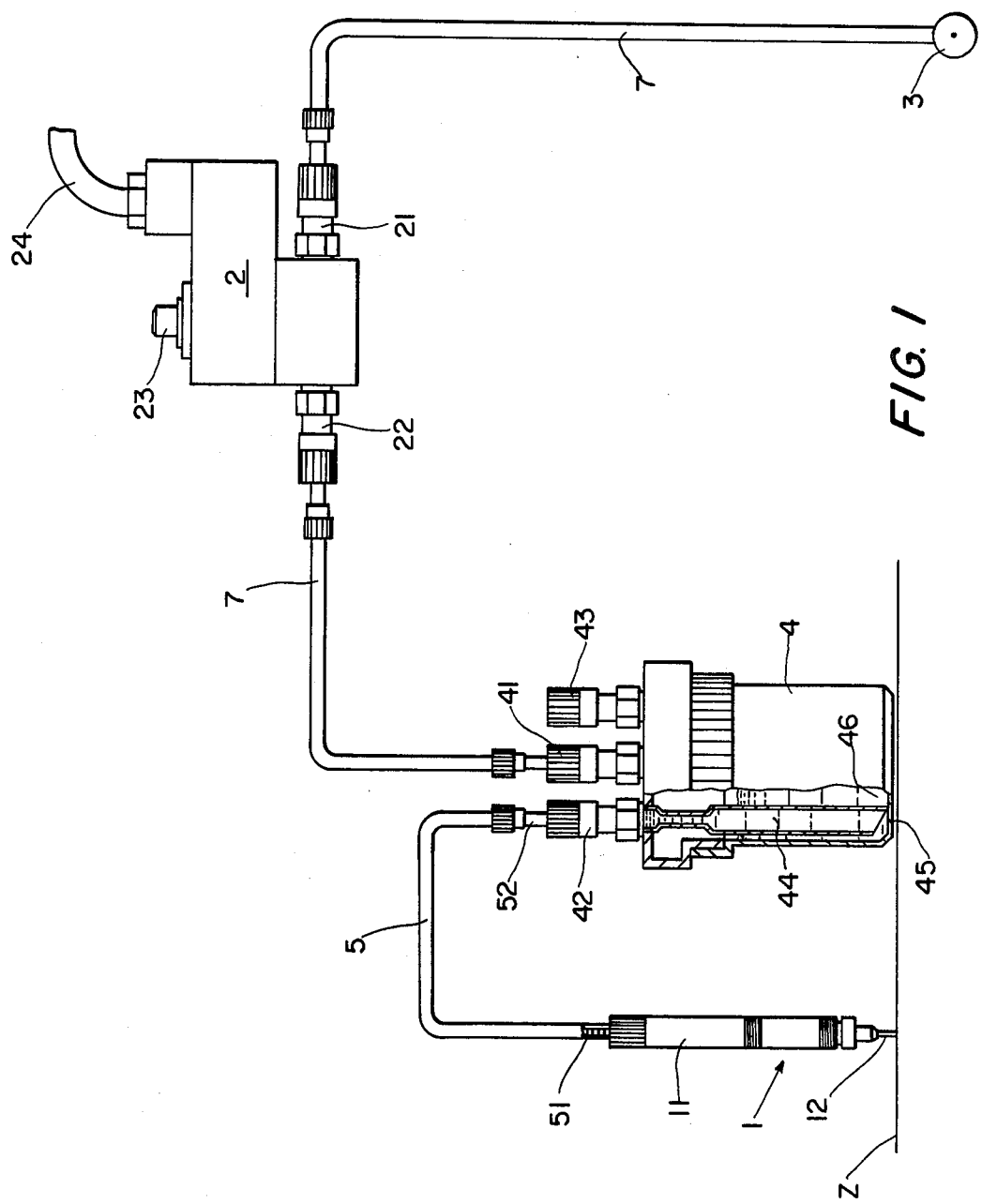
FIG. 1 is a view in elevation of the apparatus according to the present invention with several of the components being indicated schematically.

As may be seen in FIG. 1, the apparatus of the present invention has a writing unit 1 which essentially comprises a writing tip 12 and ink chamber 11 which is connected to one end 51 of a flexible air tight writing medium flow line 5. The flow line 5 has its other end 52 connected by means of a quick-release coupling to an outlet 42 which in turn is connected to the upper end of a substantially vertically disposed dip tube 44 located within a writing medium container 4. The lower end of the dip tube 44, as seen in FIG. 1, is near the bottom portion 46 of the container 4 and is closely spaced from the inner surface of container bottom 45. The lower end of the dip tube must always be positioned below the surface of the liquid writing medium within the container since, if otherwise, should the writing unit be raised there will no longer be effectively retaining forces in the writing unit because of the temporarily reduced pressure and the writing medium can under certain circumstances flow out of the writing tip 12. Also, there would be an interruption in the writing of the writing tip during the operation thereof as a result of air entering into the lower end of the dip tube.

The pressurizing system for the apparatus consists of a source of compressed air 3 as known in the art and the discharge of this source is connected to a discharge line 7 which in turn is connected to a changeover valve 2. The valve 2 is preferably a 3/2-way valve which is electromagnetically actuated and connected through an electrical control line 24 to the control device of the writing or drawing machine. The changeover valve 25 functions to enable compressed air to act during the recording or operating process upon the surface of the writing medium within the container 4 through the inlet connection 21, outlet connection 22 while during any pauses in operation or in moving the writing unit to its inoperative position the compressed air is then conducted through a third path or outlet 23 into the atmosphere. The changeover valve 2 is thus automatically actuable in response to the operating position and operation of the writing unit.

The duct 7 continues from outlet 22 to inlet connection 41 on the container 4. The container 4 is provided with a third outlet connection 43 and it is preferred that all connections 41, 42 and 43 be of the quick-release coupling type.

The bottom 45 of the container 4 is located on approximately the same horizontal plane z as the writing tip 12 of the writing unit 1 or may be slightly above the writing tip 12. It is preferable that the vertical space between the writing tip 12 and the bottom 45 of the container be 10–15 mm. but may extend to as much as 1–20 mm. It is immaterial whether the bottom of the container is located above or below the end of the writing tip.

It is preferred that the pressure exerted by the compressed air upon the surface of the liquid writing medium within the container 4 be about 0.1 bar but may range from 0.05 to 1 bar.

It is also preferable that the vertical distance of the writing tip 12 between its operative and nonoperative positions be 2–5 mm. but may range to 1–10 mm.

The quick-release coupling 42 of the writing unit 1 to the container 4 facilitates removal of the writing unit such as for cleaning or repairing purposes and also facilitates the connection of different types or sizes of writing tips to the writing machine.

It is preferable that the 3/2-way valve be abruptly changed over electromechanically, electromagnetically or some other suitable way so as to provide satisfactory operation of the changeover valve. The outlet 23 to the atmosphere of the changeover valve 2 may be provided with a throttle valve so that the air being vented therefrom may be regulated according to appropriate circumstances and conditions such as, for example, the size of the writing tip and the desired height of the liquid medium level within the writing unit.

Although the apparatus of the present invention as described above operates satisfactorily without any additional elements, it may be necessary to be able to equalize different conditions particularly with respect to the speed at which the writing unit is moved in drawing, or recording and the flow of the writing medium as a whole by adjusting the air pressure in the pressure system and also the speed of flow of the medium. This can be done by adding additional regulating and control devices.

Figure 2:
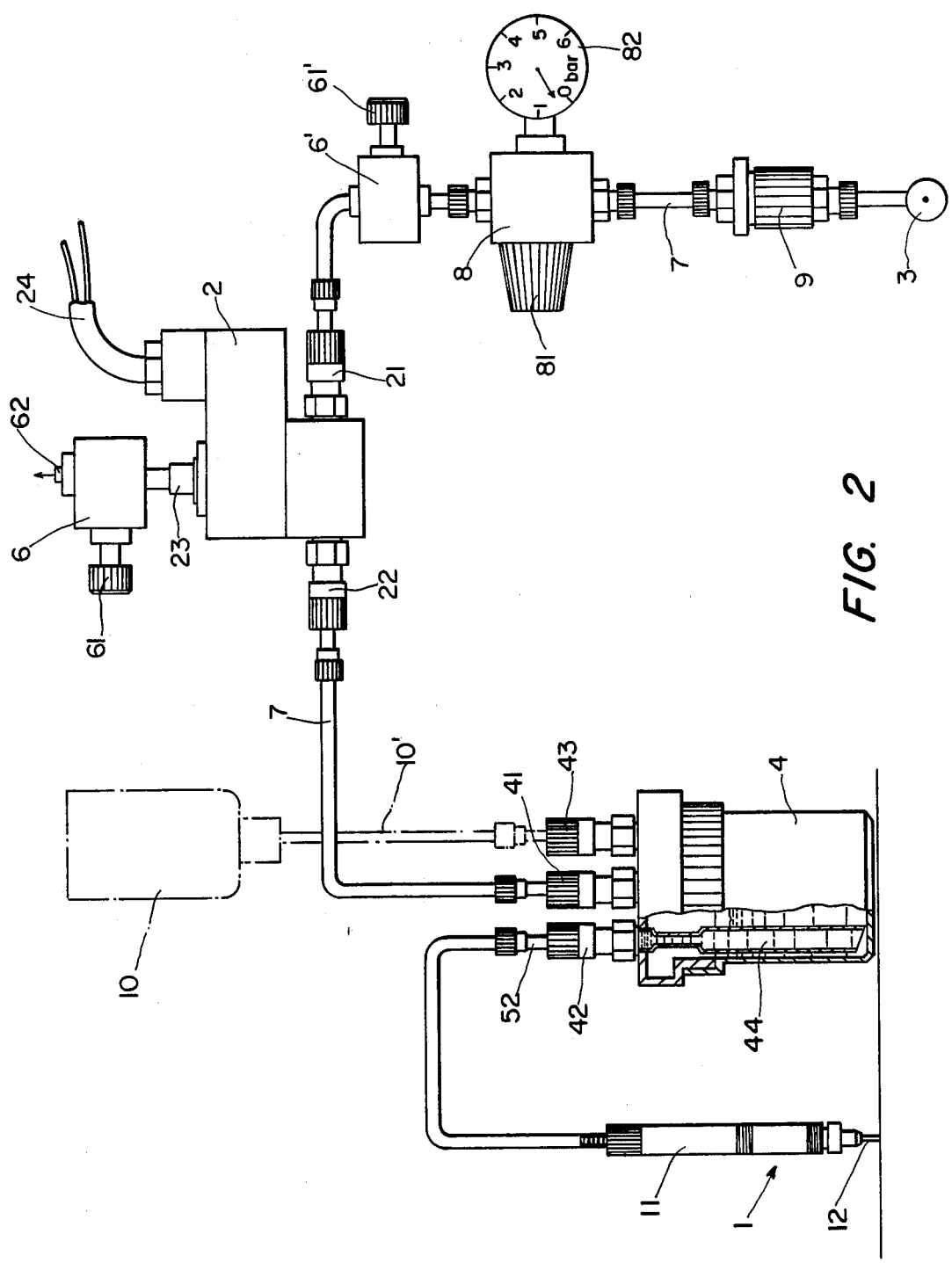
FIG. 2 is a view similar to that of FIG. 1 but showing a modification thereof.

In FIG. 2, there is shown a modification which in addition to the components of FIG. 1 has additional control and regulating devices for fine tuning and adjusting of the apparatus to different working conditions and different writing tips. In the modification, a check valve 9 is connected in the discharge line 7 leading from the compressed air source 3. The check valve 9 is preferably constructed as a 2/2-way valve and can similarly be changed over so that the stream of compressed air can be completely interrupted, particularly when there are long pauses or interruptions in operation of the writing unit or when it is desired to completely shut off the apparatus.

In addition, a pressure reducing or regulating valve 8 which can be controlled manually or automatically by means of a suitable regulating knob 81 is connected in the line 7 leading from check valve 9. The valve 8 is preferably provided with a gage or suitable monitoring instrument 82 for indicating existing pressure. The apparatus is further equipped with a throttle valve 6' which under suitable circumstances enables a precise adjustment of the rate of flow of the compressed air through the apparatus. The changeover valve 2 is then connected to the output of the throttle valve 6'.

The throttle valve 6' may also be provided with a control member in the form of a knob 61'.

The changeover valve 2 is preferably a 3/2-way valve which is automatically actuatable and conducts the flow of compressed air through inlet 21 and outlet 22 through line 7 into the writing medium container 4 or, on changeover into the atmosphere through the third path 23. A flexible flow line has one end connected directly to the ink chamber of the writing unit 1 and the other end to a dip tube 44 located within the container 4 and having an open end closely spaced from the bottom of the container. A reduced pressure is thus established within the container 4 by the simultaneous open position of the valve 2 and this produces a minimum sucking back of the writing medium column within the writing tip 12 of the writing unit 1 through the ink chamber 11 and the dip tube 44. In this construction it is preferable to mount an additional throttle valve 6 at the outlet 23 of the changeover valve 2 in order to adjust the different pressure and flow conditions of the writing unit and of the writing medium container and for establishing the desired reflux column height of the writing medium. These reduced pressure conditions can be individually regulated by the adjustment knob 61 and the outlet 62 which now opens into the atmosphere.

The changeover valve 2 is similarly automatically actuated by means of a control device connected through leads 24 to a control device which is responsive to the operating position and mode of operation of the writing unit.

In order to refill the writing medium container 4 with a writing medium, a refill reservoir or container 10 may be provided as indicated and connected through a flow line 10' and connection 43 to the container 4. This will enable the writing medium to be supplemented and replenished at any time even during operation of the apparatus without the necessity for opening the apparatus or the writing medium container 4.

Figure 3:
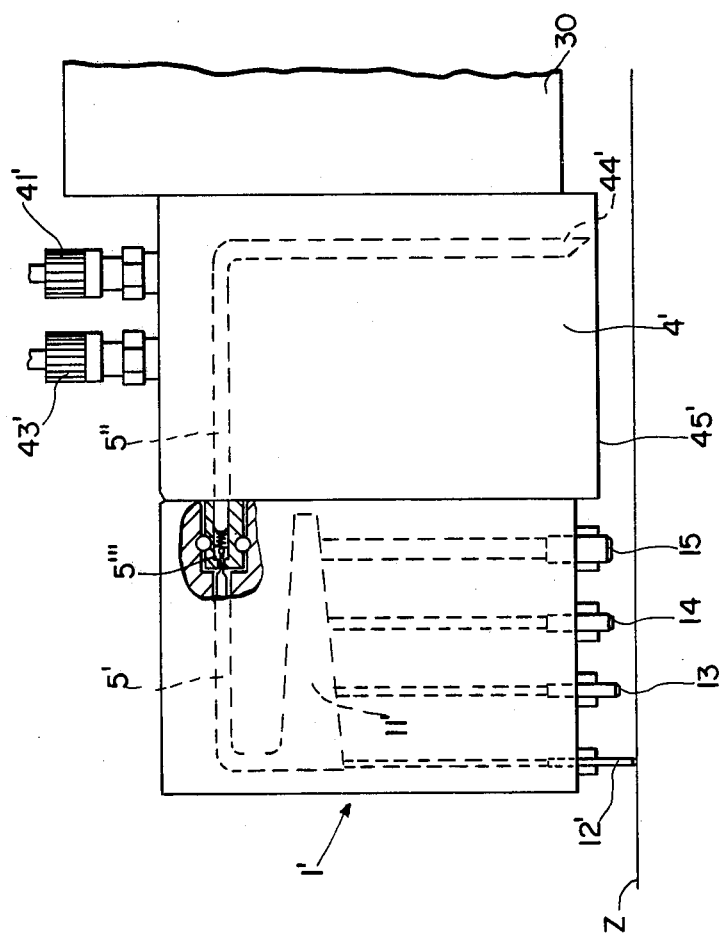
FIG. 3 is an elevational view of a further modification wherein the writing unit is attached directly to the container.

In the modification of FIG. 3, writing unit 1' is coupled directly to the writing medium container 4'. The coupling, which is not shown, is preferably of the quick acting or quick release type and the flow lines 5' and 5" are preferably connected together in an air tight manner by means of a quick-release coupling 5'''. The writing unit 1' not only has a first writing tip 12' but additional writing elements 13, 14 and 15 which are illustrated in their inoperative positions. The chamber 11' of the writing unit 1' is thus almost completely filled with writing medium and is preferably constructed such that a small volume of a writing medium is located above the writing tip of greatest diameter than above a writing tip of a small diameter. As a result of this construction, the different rates of flow or discharge from the different writing tips can be readily compensated for in a simple manner so that in suitable circumstances a change of the pressure setting on the use of different writing tips is superfluous.

A medium container 4' similarly has a dip tube 44' which extends almost to contact with the innersurface of the bottom 45' of the container and is also provided with an air connection 41' and a filling connection 43'. The bottom 45' of the container is located at somewhat greater distance from the horizontal plane z but this will not impair in any way the reliability of function or mode of operation of the apparatus.

The writing medium container 4' can be attached to guide slide 30 in any suitable manner and may include a quick-acting connection when it is desired that the container 4' and the writing unit 1' be removed as a unit or be interchangeable which, for example, may be desirable when different types or different colors of writing media are to be utilized. The structure for providing compressed air is similar to that of the construction shown in FIGS. 1 and 2 or may be modified, if desired, in a suitable manner.

The reliable and satisfactory operation of the apparatus will be achieved regardless of whether the entire writing unit 1 is vertically displaceable as in FIGS. 1 and 2 whether this vertical movement is carried out only by the writing tips 12', 13, 14, 15 as disclosed in the apparatus of FIG. 3.

While the output pressure of the source of compressed air will in general be constant, it may be desirable to use a controllable pressure reducing valve between the compressed air source and the changeover valve in order to more precisely vary the pressure acting on the surface of the writing medium in the container. When conventional writing tips with different tube diameters are used, it is preferable that the pressure be 0.1 bar but the pressure may range from 0.05-1 bar. Regulation of the pressure reducing valve can be carried out manually or automatically, such as synchronously with the drawing speed of the writing unit by the control device of the writing or drawing machine. For automatic control, the pressure reducing valve may be constructed as an electromechanically controllable control valve.

The use of a check valve after the source of compressed air and a further throttle valve between this check valve and the changeover valve permits the flow of air to be shut off or to be manually or automatically controlled as it flows through the system so as to produce an extremely fine individual adjustment dependent on the respective recording or writing conditions.

The apparatus according to the present invention with a corresponding choice of writing tip will operate up to a drawing speed of 1 meter/sec. or more satisfactorily and reliably without any blob formation and any interruption phenomenon, either at the beginning, during or at the end of the recording or drawing process. As a result, this apparatus is particularly suitable for use of all known writing, drawing or recording machines and particularly with numerically controlled automatic machines.

It will be understood that this invention is susceptible to modification in order to adapt it to different usages and conditions and, accordingly, it is desired to comprehend such modifications within this invention as may fall within the scope of the appended claims.

What is claimed is:

1. In an apparatus for supplying a liquid writing medium to the writing unit of a writing or drawing device or the like, a closed air-tight container for a liquid writing medium having a bottom, said container having a substantially vertical tube therein dipping below the surface of writing medium therein, a writing unit having an ink chamber therein and a writing tip and connected to said tube in the container by a flow line, the bottom of said container disposed in substantially the same horizontal plane as said writing tip of the writing unit, means connected to said container for supplying air under pressure to the surface of the writing medium within the container, valve means interconnected between said container and said air supplying means for regulating the flow of liquid writing medium to the writing unit by supplying writing medium when the writing unit is operative and interrupting the writing medium when the writing unit is inoperative, the surface area of the writing medium within the container being considerably greater than the surface are of the writing medium in the ink chamber within the writing unit.

2. In an apparatus as claimed in claim 1 wherein said container is stationary and said writing unit is vertically and horizontally displaceable.

3. In an apparatus as claimed in claim 1 wherein said flow line is flexible and air-tight and has a first end connected to a writing medium chamber in said writing unit and a second end connected to said tube in said container, said tube having an open end closely spaced from the bottom of the container.

4. In an apparatus as claimed in claim 1 wherein said writing unit is connected to said container by a releasable connection to define a single unit, a quick-release coupling in the flow line between said writing unit and said container.

5. In an apparatus as claimed in claim 1 wherein said valve means comprises an opening to the atmosphere to vent the apparatus.

6. In an apparatus as claimed in claim 5 and further comprising a first throttle valve connected in said opening to the atmosphere.

7. In an apparatus as claimed in claim 1 and further comprising a pressure regulating valve interconnected between said valve means and said air supplying means to regulate air pressure acting on the surface of the writing medium within said container.

8. In an apparatus as claimed in claim 7 wherein said pressure regulating valve comprises an electromechanically actuated control valve.

9. In an apparatus as claimed in claim 7 wherein said pressure regulating valve is responsive to the operating speed of the writing unit and to the size of the writing tip.

10. In an apparatus as claimed in claim 7 and further comprising a second throttle valve interconnected between said air supplying means and said pressure regulating valve.

11. In an apparatus as claimed in claim 1 wherein the pressure on the surface of the writing medium in the container is 0.05 to 1.0 bar.

12. In an apparatus as claimed in claim 1 wherein said air supplying means has a discharge line and a check valve in said discharge line.

13. In an apparatus as claimed in claim 1 wherein said writing tip has a vertical displacement of 1-10 mm. between its operative and nonoperative positions.

14. In an apparatus as claimed in claim 1 wherein there is a vertical distance of 1-20 mm. between the bottom of said container and the writing tip in its operative position.

* * * * *